United States Patent
Hardesty et al.

(10) Patent No.: US 6,932,547 B2
(45) Date of Patent: Aug. 23, 2005

(54) TOOLHEAD ASSEMBLY FOR CNC MACHINES HAVING MISALIGNMENT PREVENTION MEANS

(75) Inventors: Michael P. Hardesty, Dale, IN (US); David Stutsman, Huntingburg, IN (US)

(73) Assignee: Thermwood Corporation, Dale, IN (US)

( * ) Notice: Subject to any disclaimer, the term of this patent is extended or adjusted under 35 U.S.C. 154(b) by 39 days.

(21) Appl. No.: 10/744,042

(22) Filed: Dec. 24, 2003

(65) Prior Publication Data

US 2005/0141975 A1 Jun. 30, 2005

(51) Int. Cl.[7] .............................. B23C 1/06; B23C 1/12
(52) U.S. Cl. ...................... 409/201; 409/216; 409/193; 408/236; 408/127; 408/8; 901/45; 901/49
(58) Field of Search ................................ 409/201, 216, 409/138–140, 180, 193, 141, 186, 207; 408/236–237, 408/8–9, 127; 901/41, 45, 49

(56) References Cited

U.S. PATENT DOCUMENTS

| | | | | |
|---|---|---|---|---|
| 1,782,633 A | * | 11/1930 | Schiltz | 408/127 |
| 4,332,066 A | * | 6/1982 | Hailey et al. | 408/237 |
| 4,571,148 A | * | 2/1986 | Drazan | 901/45 |
| 4,637,775 A | * | 1/1987 | Kato | 409/201 |
| 4,797,564 A | * | 1/1989 | Ramunas | 901/46 |
| 4,800,802 A | * | 1/1989 | Rebman | 901/45 |
| 4,836,722 A | * | 6/1989 | Kurita et al. | 409/180 |
| 5,765,975 A | * | 6/1998 | Hoffmann et al. | 409/201 |

FOREIGN PATENT DOCUMENTS

| | | | |
|---|---|---|---|
| EP | 421917 A1 | * | 4/1991 |
| JP | 60-131106 A | * | 7/1985 |
| JP | 64-2811 A | * | 1/1989 |

* cited by examiner

Primary Examiner—Erica Cadugan
(74) Attorney, Agent, or Firm—Stevens, Davis, Miller & Mosher, LLP

(57) ABSTRACT

A toolhead assembly for a CNC machine displaceable along orthogonal x, y and z-axes generally consisting of a support assembly, a tool carrier supported on the support assembly having a rotatable tool axis and being displaceable relative to the support assembly between a first position wherein the tool axis is aligned with the z-axis and a second position wherein the tool axis is misaligned with the z-axis, structure for yieldably biasing the tool carrier assembly into the first position and structure responsive to a displacement of the tool carrier assembly to the second position for breaking an electrical grounding circuit of a controller operatively connected to the machine.

22 Claims, 4 Drawing Sheets

TOOLHEAD ASSEMBLY FOR CNC MACHINES HAVING MISALIGNMENT PREVENTION MEANS

This invention relates to CNC machines having a toolhead assembly displaceable along orthogonal x, y and z-axes, and more particularly to such machines provided with means for preventing the misalignment of such toolhead assembly caused by such assembly accidentally striking a workpiece or fixture mounted on the machine or another component of the machine.

BACKGROUND OF THE INVENTION

A typical type of CNC machine in the prior art used to rout, drill, saw and sand various workpieces generally consists of a base unit, a worktable mounted on such base unit, a gantry, a toolhead support assembly mounted on the gantry and a controller for controlling the operation of various movable components of the machine. The worktable may be mounted on the base unit and displaced along a longitudinal line of travel relative to the base unit, commonly referred to as the y-axis. Alternatively, the worktable may be rigidly mounted on the base unit and the gantry may be supported on and displaced relative to the base unit along the y-axis. The toolhead assembly usually is mounted on a toolhead support assembly which is mounted on a front face of a transversely disposed section of the gantry, spaced above the worktable. The toolhead support assembly is displaceable relative to the gantry along a transverse line of travel, commonly referred to as the x-axis, and the toolhead assembly is displaceable relative to the toolhead support assembly along a vertical line of travel commonly referred to as the z-axis. Displacement of such components typically is provided by a drivescrew mounted on one of such components, a follower mechanism mounted on a cooperating component, cooperable with the drivescrew, and a servomotor operated by the controller in accordance with a selected program inputted by various means into the controller.

Tools mounted on such toolhead assembly of such machines further may be provided with additional assemblies providing additional freedom of movement including a first carrier assembly rotatable about the z-axis and a second carrier assembly mounted on the first carrier assembly and rotatable about an axis perpendicular to the z-axis commonly referred to as the a-axis, further provided with a tool rotatable about an axis perpendicular to the a-axis, commonly referred to as the c-axis. The shafts of the z a-axes normally are driven by servomotors and the tool is driven by an electric motor, mounted on the toolhead assembly and operated by the controller. Such machines provided with additional freedom of movements commonly are referred to as five-axes machines.

In the proper operation of such machines, it is required that the x, y and z-axes be precisely orthogonal, and that in five-axes machines, the a-axis be perpendicular to the z-axis and the c-axis be perpendicular to the a-axis. Otherwise, a program inputted into the machine will fail to produce a part of a desired configuration with precise dimensions.

In the normal use of such machines in production, it often occurs that the toolhead assembly accidentally strikes a workpiece or fixture mounted on the worktable of such machines or another component of the machine, resulting in a misalignment of one or more of the axes of the machine, requiring recalibration of the machine. Such recalibration may require the service of a skilled technician and may be time consuming, resulting in a loss of production of the machine and correspondingly additional production costs. It therefore is desirous and the principal object of this invention to provide a means in the type of machine described for preventing a misalignment of one or more of the axes of the toolhead assembly thereof upon circumstances where such assembly accidentally strikes an object tending to cause permanent misalignment of one or more axes of the machine, requiring recalibration or in more severe circumstances, a major repair or replacement of the toolhead assembly.

SUMMARY OF THE INVENTION

The present invention provides a toolhead assembly for the type of machine described which prevents misalignment of any of the z, a or c-axes upon the toolhead assembly accidentally striking a workpiece or fixture on the worktable of the machine or any other component of the machine, by mounting the first carrier assembly of the toolhead assembly on the support assembly of the toolhead assembly in a manner in which the first carrier assembly is displaceable between a first position in which the axis of rotation of the first carrier assembly is in alignment with the z-axis and a second position in which the axis of rotation of the first carrier assembly is misaligned with the z-axis, providing means for yieldingly biasing the first carrier assembly in the first position and further providing an electrical grounding circuit for the controller including a pair of contacts normally engageable when the first carrier assembly is in the first position to ground the controller and permit it to operate, and disengageable when the first carrier assembly is in the second position to break the grounding circuit and thus cause the controller to become inoperable. The first carrier assembly assumes such second position only when the first or second carrier assemblies accidentally strikes an object that would normally tend to misalign the z, a or c-axes. The biasing action of the means interconnecting the first carrier assembly and the support assembly of the toolhead assembly and the sequential shut down of the machine prevents any misalignment of such axis upon striking an object on the machine. The biasing means may consist of a spring allowing the first carrier assembly to displace relative to the support assembly, having a spring force sufficient to counteract the force applied to a tool of the machine during a normal machining operation yet insufficient to counteract the force applied to the tool upon accidentally striking an object.

DESCRIPTION OF THE PREFERRED EMBODIMENTS OF THE INVENTION

Figure 1:
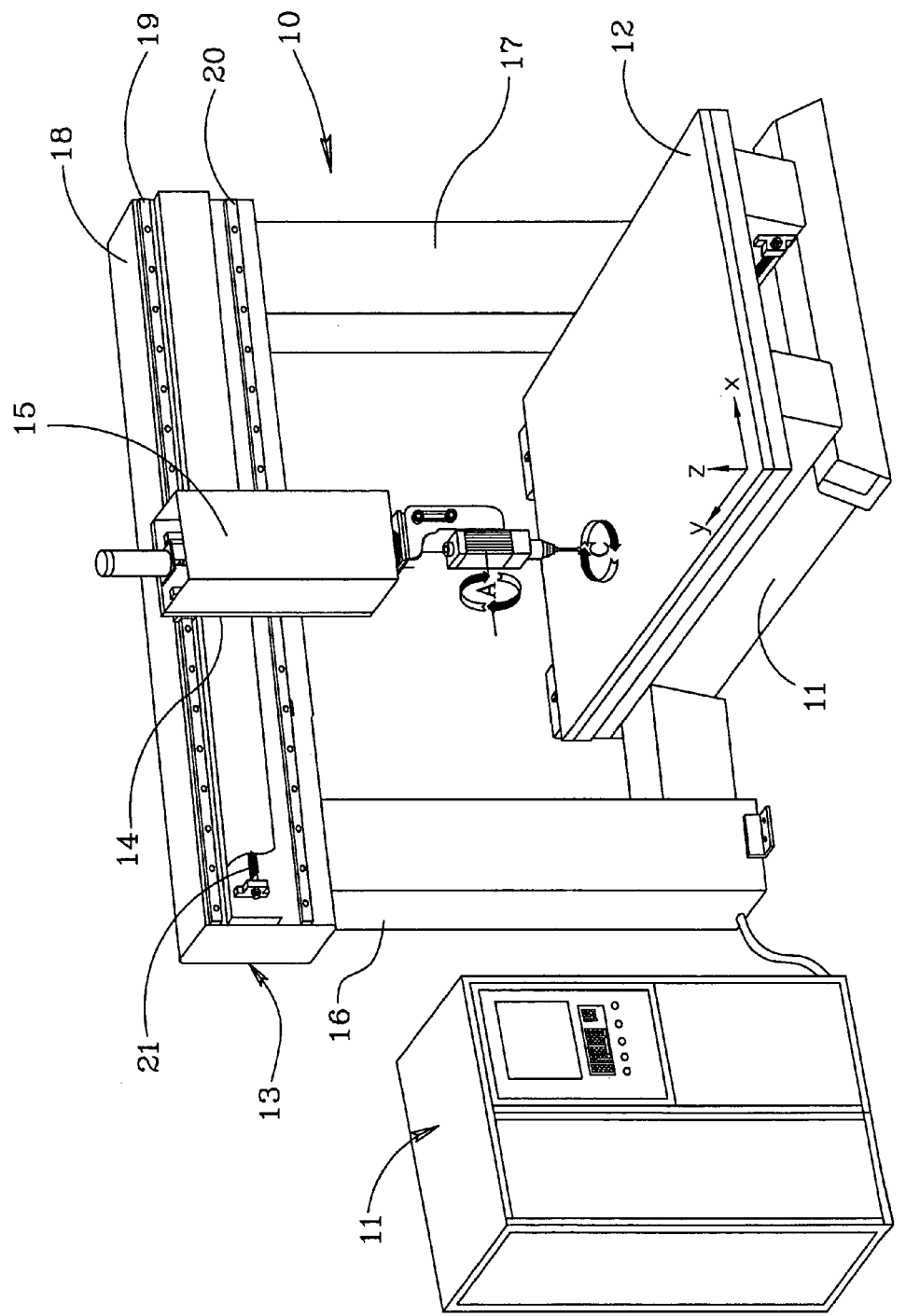
FIG. 1 is a perspective view of a CNC machine, embodying the present invention.

Referring to FIG. 1 of the drawings, there is illustrated a five-axis, CNC machine 10 adapted to be operated by a programmable controller 11. The machine includes a base member 11, a worktable 12, a gantry 13, a toolhead mounting assembly 14 and a toolhead assembly 15. Base member 11 is of a welded steel construction and worktable 12 is supported on the base member and displaceable longitudinally or along the y-axis. Displacement of the worktable is provided by a pair of drivescrews mounted on the base member, a pair of followers cooperating with the drivescrews and connected to the worktable and several servomotors operated by computer 11. Gantry 13 straddles the base member and worktable and includes a set of leg sections 16 and 17 flanking and connected to the base member, and a transverse section 18 connected to and spanning the upper ends of the leg sections, above the worktable. The front face of traverse section 18 is provided with a pair of transversely extending, vertically spaced guide rails 19 and 20 on which there is supported toolhead support assembly 14 for displacement transversely along the x-axis. Such displacement is effected by a drivescrew 21 mounted on the front face of gantry transverse section 18 cooperating with a follower mechanism on the toolhead support assembly and driven by a servomotor operated by the controller. A similar arrangement of a drivescrew cooperating with a follower mechanism and servomotor functions to displace toolhead assembly 15 relative to toolhead support assembly 14 vertically along a z-axis.

Figure 2:
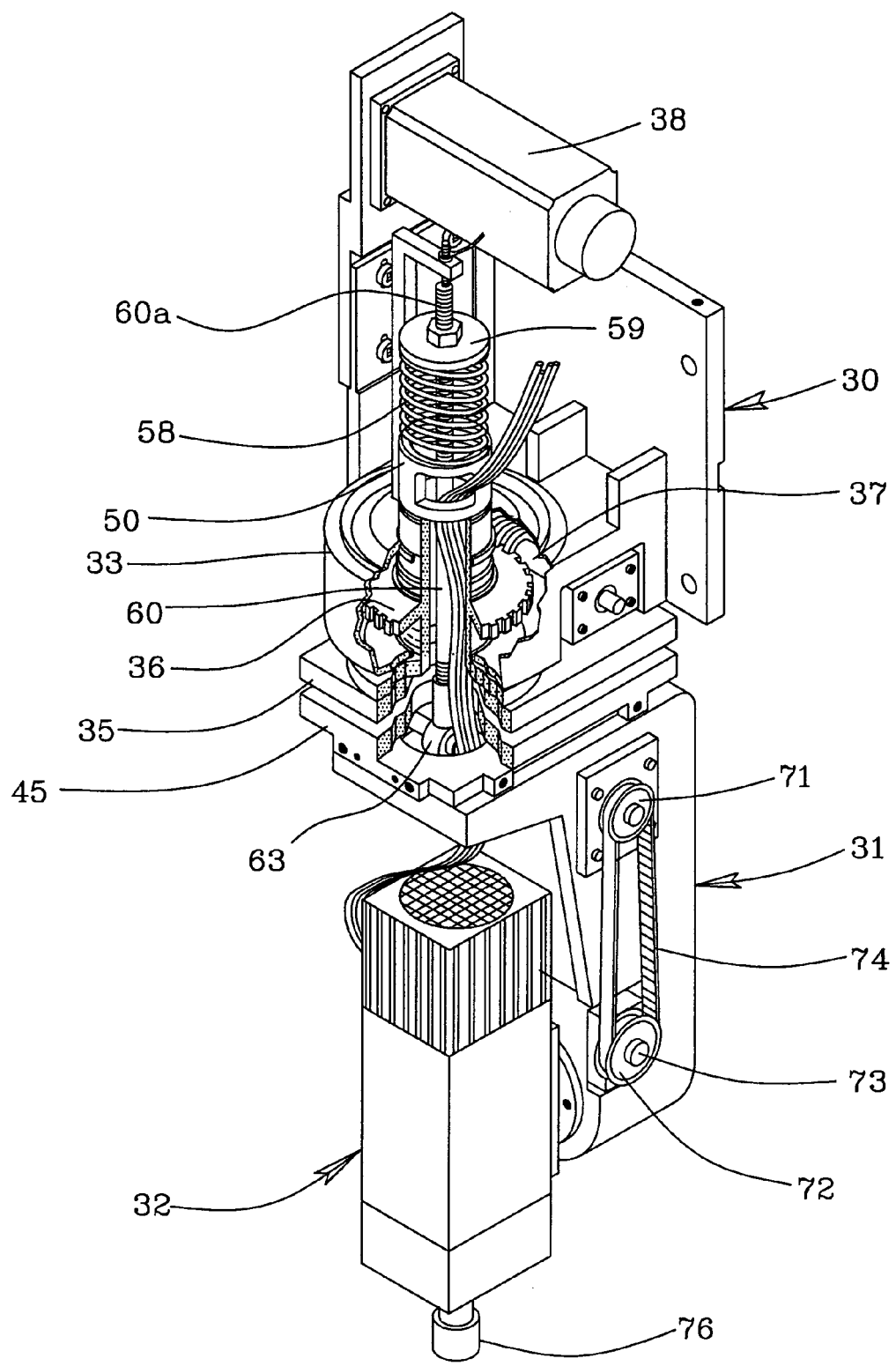
FIG. 2 is an enlarged, cross-sectional view of the toolhead assembly of the machine shown in FIG. 1, having portions thereof broken away.
Figure 3:
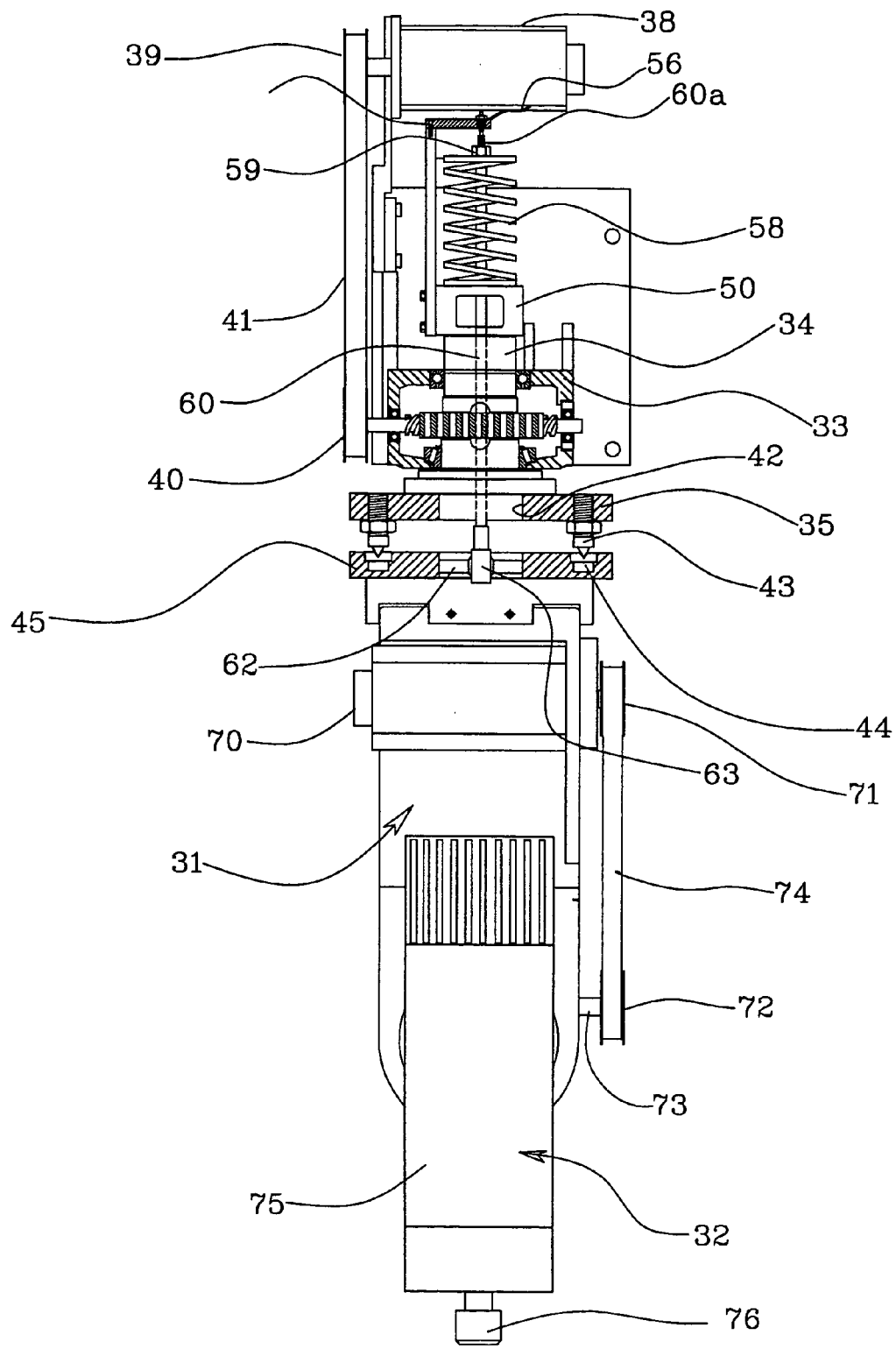
FIG. 3 is an enlarged, front elevational view of the toolhead assembly shown in FIG. 2, having portions thereof shown in vertical cross-section.

The toolhead assembly is best illustrated in FIGS. 2 and 3. It includes an upper support assembly 30, a first carrier assembly 31 supported on and depending from upper support assembly 30 and a second carrier assembly 32 supported on first carrier assembly 31. Mounted within support assembly 30 is a bearing housing 33 provided with a center opening in which there is seated a pair of upper and lower bearings. Journaled within such bearings along the z-axis is a tubular shaft 34 connected at a lower end thereof to a plate member 35, providing an annular seating surface on the upper end thereof and having a ring gear 36 rigidly secured to an intermediate portion thereof within gear housing 33. Ring gear 36 meshes with a worm gear 37 disposed within bearing housing 33 and journaled in bearings mounted in the annular side wall of the bearing housing. The worm gear is operatively connected to and driven by a servomotor 38 supported on the support assembly by means of a pulley 39 mounted on the output shaft of solenoid 38, a pulley 40 mounted on the shaft of the worm gear and a belt 41 trained about such pulleys.

Plate member 35 is provided with a center opening 42 and a set of depending fulcrum pins 43 which are adapted to be received and seated within a set of recesses 44 of a plate member 45 spaced below plate member 35 and having a center opening vertically aligned with opening 42 in plate member 35.

Figure 4:
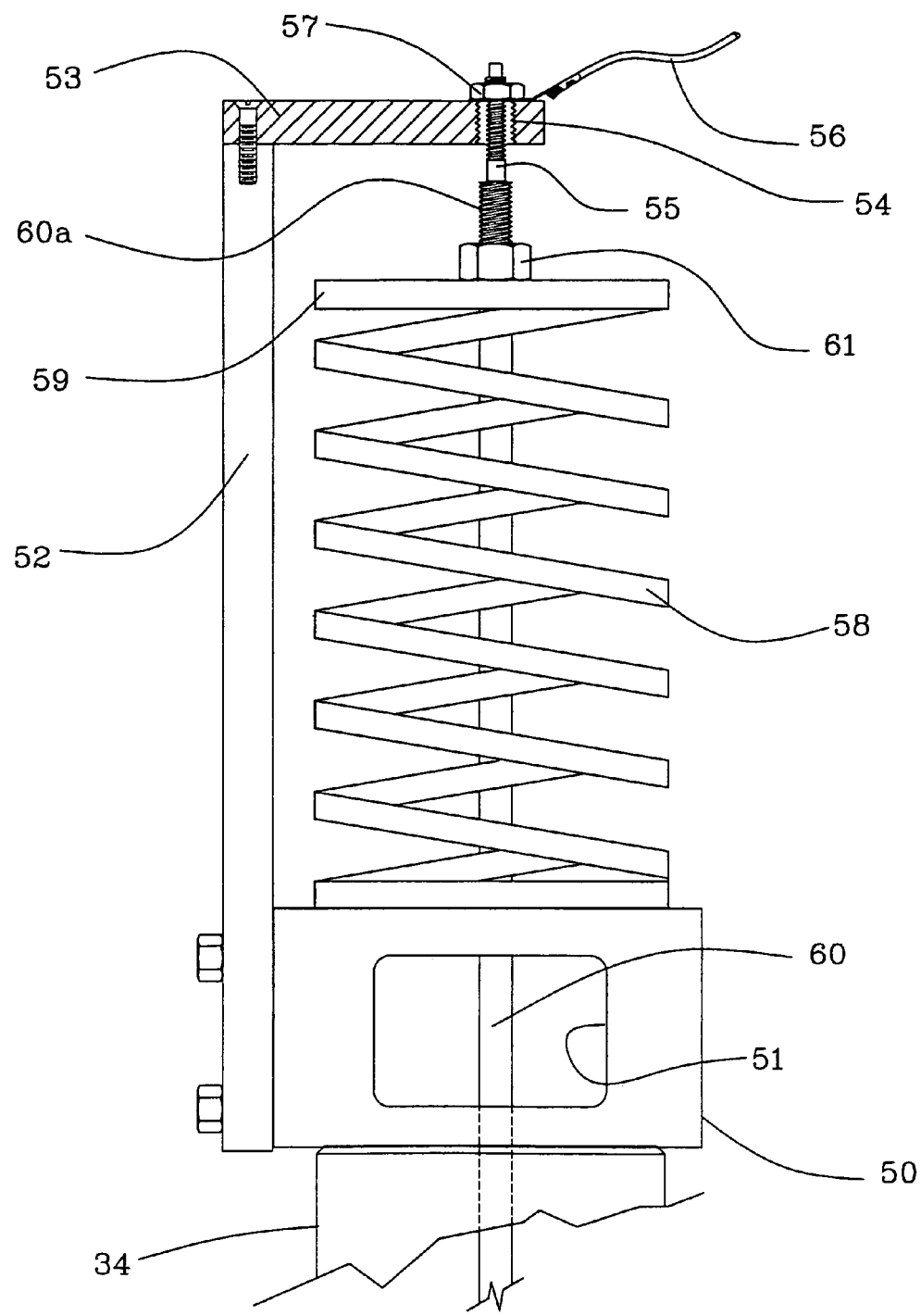
FIG. 4 is an enlarged, fragmentary view of an upper end portion of the toolhead assembly shown in FIGS. 2 and 3.

As best shown in FIG. 4 an annular member 50 is rigidly mounted on the upper end of tubular shaft 34 having an opening 51 in the side wall thereof. Mounted on the side wall of member 50 and extending upwardly is a support strut 52 having an inwardly extending arm portion 53 at the upper end thereof. Provided in a threaded opening in the inner end of arm portion 53 and aligned with the z-axis is an insulating insert 54 having a metallic conducting pin 55 threaded therein and extending above and below arm portion 53. A line 56 of the electrical grounding circuit of the computer is connected to the upper end of connecting pin 55 by means of a nut 57 threaded on the upper exposed end of pin 55.

Seated on the upper end of annular member 50, coaxially with the z-axis, is a coil spring 58 having a washer 59 seated on the upper end thereof. Disposed within spring 58 and extending down through tubular shaft 34, ring gear 36 and opening 42 of plate member 35 is a rod member 60 formed of an electrically conducted material. The upper end of rod member 60 is threaded, extends through a center opening in washer 59, is provided with a nut 60 threaded thereon and engages pin 55 to electrically connect pin 55 and correspondingly the electrical grounding circuit of the computer to ground. The lower end of rod member 60 is connected to a member 62 of plate member 45 by means of a swivel joint 63.

First carrier assembly 31 is secured to and depends from plate member 45. It is provided with a servomotor 70 at an upper end thereof and an output shaft at the lower end thereof disposed perpendicularly to the z-axis, commonly referred to as the a-axis. Drive is transmitted from servomotor 70 to such lower shaft by means of a pulley 71 mounted on an output shaft of servomotor 70, a pulley 72 mounted on the shaft of a worm gear 73 disposed within the housing of carrier assembly 31, a belt 74 trained about pulleys 71 and 72 and a ring gear (not shown) mounted on the lower output shaft of carrier assembly 31, meshing with worm gear 73.

Carrier assembly 32 essentially consists of an electric motor 75 operating a tool mounted in a collet 76. Collet 76 is mounted on an output shaft of motor 75, having an axis of rotation disposed perpendicularly to the lower output shaft of carrier assembly 31, commonly referred to as the c-axis.

When the components of the toolhead assembly are disposed in the condition as shown in FIGS. 2 and 3, carrier assembly 31 will be axially aligned with base assembly 30 along the z-axis, drive will be transmitted from solenoid 38 through belt 41, ring gear 36, plate member 35 and fulcrum pins 43 seated in recesses 44 of plate member 45 to carrier assembly 31 and correspondingly carrier assembly 32, and the electrical grounding circuit of the computer will be connected to ground by virtue of the electrical contact of the upper end 60a of rod member 60 with contact pin 50, permitting the controller to operate. The computer further will function to operate solenoid 70 to rotatably position carrier assembly 32 about the a-axis, and rotate a tool mounted in collet 76 about the c-axis, to correspondingly execute a program for machining a part mounted on the worktable of the machine.

Whenever the tool mounted in collet 76, lower carrier assembly 32 or upper carrier assembly 31 accidentally strikes a workpiece or a fixture mounted on the worktable of the machine or a component of the machine, plate member 45 and correspondingly upper and lower carrier assemblies 31 and 32 will be caused to angularly displace relative to the z-axis about one or more fulcrum pins 43. Such angular displacement is permitted by means of swivel 63 interconnecting the lower end of rod 60 and plate member 45. As plate member 45 thus angularly displaces relative to plate member 35, rod member 60 will be caused to compress spring 58 and thus displace downwardly against the biasing action of spring 58 to correspondingly break the electrical contact between the upper end 60a of the rod member and engaging pin 55. As such electrical contacts separate, the electrical grounding circuit of the computer will be broken, causing the computer to shut down. The shutdown of the computer correspondingly will denergize the various servomotors of the machine acting to drive the toolhead assembly in the undesired direction tending to misalign the z, a and/or c-axes.

The force of spring 58 is adjusted to permit the tool to follow a desired pattern as the controller executes an inputted program, without causing the spring to compress and thus discontinue the operation of the computer and correspondingly the operation of the servomotors. Such spring force, however, is not adjusted to the point of failing to compress the spring upon one or more of the components of the toolhead assembly accidentally striking an object. Such spring force further is adjusted to permit a slight compression of the spring prior to shutdown to absorb some of the energy created upon impact of the tool or other component of the toolhead assembly with an object accidentally struck. Adjustment of the spring force may be accomplished merely by rotating nut 61 threaded on the upper end of the rod member and bearing against washer 59.

Depending pins 43 function not only to permit the lower carrier assemblies to angularly displace relative to the upper base assembly but also to transmit drive from the upper base assembly to the upper carrier assembly. Any number of pins greater than three may be used seated in recesses 44 including sets of four and five pins.

With the z, c and a-axes properly calibrated initially and spring 58 properly calibrated, the z-axis will be perpendicular to the plane defined by the x and y-axes, the a-axis will be perpendicular to the z-axis and the c-axis will be perpendicular to the a-axis. Upon any component of the carrier assemblies accidentally striking an object on the worktable or another component of the machine, the machine shutting down as described and the toolhead assembly backing off of the object struck, the z, a and c-axes will be properly aligned, allowing the computer to be reenergized and continue to execute the inputted program to machine a part. Accordingly, the structure as described functions to prevent misalignment of the z, a and c-axes upon a tool mounted in the lower carrier assembly or either of the carrier assemblies accidentally striking an object located on the worktable of the machine or a component of the machine.

From the foregoing detailed description, it will be evident that there are a number of changes, adaptations and modifications of the present invention that come within the province of those persons having ordinary skill in art to which the aforementioned invention pertains. However, it is intended that all such variations not departing from the spirit of the invention be considered as with the scope thereof as limited solely by the appended claims.

We claim:

1. A toolhead assembly of a CNC machine, displaceable along orthogonal x, y and z-axes, comprising:
   a support assembly;
   a tool carrier assembly supported on said support assembly, having a rotatable tool axis and being displaceable relative to said support assembly between a first position wherein said tool axis is aligned with said z-axis and a second position wherein said tool axis is misaligned with said z-axis;
   means for yieldingly biasing said tool carrier assembly into said first position; and
   means responsive to a displacement of said tool carrier assembly to said second position for breaking an electrical grounding circuit of a controller operatively connected to said machine to thereby shut down the controller.

2. An assembly according to claim 1 wherein said biasing means comprises a spring.

3. An assembly according to claim 2 wherein said spring is a helical spring.

4. An assembly according to claim 3 wherein said spring is disposed coaxially with said z-axis when said tool carrier assembly is in said first position.

5. An assembly according to claim 1 wherein the biasing force of said biasing means is greater than a reactant force on a tool engaging a workpiece in the performance of said machine.

6. An assembly according to claim 1 wherein the biasing force of said biasing means is adjustable.

7. An assembly according to claim 1 wherein said tool carrier assembly is swivably displaceable relative to said support assembly between said first and second positions.

8. An assembly according to claim 1 wherein said electrical grounding circuit of said controller includes a first electrical contact disposed on said support assembly and a second electrical contact disposed on said tool carrier assembly, engageable when said tool carrier assembly is in said first position to complete said circuit and correspondingly cause said controller to energize actuating motors of said machine, and disengageable when said tool carrier assembly is in said second position to break said circuit and correspondingly cause said controller to deenergize said motors.

9. An assembly according to claim 1 wherein said tool carrier assembly abuts said support assembly, including a rod having one end thereof connected to said tool carrier assembly and having the other end thereof provided with means providing a bearing surface, and wherein said biasing means is interposed between said tool carrier assembly and said bearing surface.

10. An assembly according to claim 9 wherein said biasing means comprises a spring.

11. An assembly according to claim 10 wherein said spring is a helical spring.

12. An assembly according to claim 11 wherein said spring and said rod are alignable with said z-axis when said tool carrier assembly is in said first position.

13. An assembly according to claim 9 wherein the biasing force of said spring is greater than a reactant force on a tool engaging a workpiece in the performance of said machine.

14. An assembly according to claim 9 wherein said means providing said bearing surface comprises an annular washer fitted onto said rod member.

15. An assembly according to claim 9 wherein said other end of said rod member is threaded, and including a nut threaded on said other end which may be rotated as it bears against said washer to correspondingly vary the biasing force of said biasing means.

16. An assembly according to claim 9 wherein said electrical grounding circuit of said controller includes an electrical contact disposed on said support assembly and said other end of said rod member engageable with said electrical contact when said tool carrier assembly is in said first position to complete said circuit and correspondingly cause said controller to energize actuating motors of said machine, and disengageable therewith when said tool carrier assembly is in said second position to break said circuit and correspondingly cause said controller to deenergize said motors.

17. An assembly according to claim 9 wherein said tool carrier assembly is swivably connected to said support assembly.

18. An assembly according to claim 17 wherein the abutment of said tool carrier assembly with said support assembly comprises at least three contact points.

19. An assembly according to claim 18 wherein said contact points comprise a set of pins.

20. An assembly according to claim 19 wherein said pins are disposed on one of said support and tool carrier assemblies which are received within a set of recesses in the other of said support and tool carrier assemblies when said tool carrier assembly is in said first position.

21. An assembly according to claim 18 wherein one or more of said contact points functions as a fulcrum point or points.

22. An assembly according to claim 1 wherein said tool carrier assembly includes a first subassembly supported on said support assembly rotatable about an axis coaxial with said z-axis when said tool carrier assembly is in said first position, and having a shaft rotatable about a-axis disposed perpendicular to the axis of rotation of the first subassembly, and a second subassembly supported on said first subassembly rotatable about said a-axis, having a tool rotatable about a c-axis disposed perpendicular to said a-axis.

* * * * *